United States Patent
Wang et al.

(12)
(10) Patent No.: US 6,422,703 B1
(45) Date of Patent: Jul. 23, 2002

(54) PROJECTION DISPLAY WITH TWIN-BLOWER HEAT-DISSIPATING SYSTEM

(75) Inventors: Cheng Wang, Hsin-Chu; I-Ping Chiu, Pan-Chiao; Fu-Ming Chuang, Hsin-Chu Hsien, all of (TW)

(73) Assignee: Prokia Technology Co., Ltd., Hsin-Shih Hsiang (TW)

( * ) Notice: Subject to any disclaimer, the term of this patent is extended or adjusted under 35 U.S.C. 154(b) by 15 days.

(21) Appl. No.: 09/739,407

(22) Filed: Dec. 18, 2000

(51) Int. Cl.⁷ .................. G03B 21/26; G03B 21/16; G03B 21/18
(52) U.S. Cl. .................. 353/61; 353/58; 353/57
(58) Field of Search ................ 353/52, 57, 58, 353/60, 61, 30, 31, 119; 352/146

(56) References Cited

U.S. PATENT DOCUMENTS

| 6,007,205 | A | * | 12/1999 | Fujimori | 353/57 |
| 6,254,238 | B1 | * | 7/2001 | Takamatsu | 353/61 |
| 6,280,038 | B1 | * | 8/2001 | Fuse et al. | 353/57 |
| 6,334,686 | B1 | * | 1/2002 | Shiraishi et al. | 353/119 |

* cited by examiner

Primary Examiner—Russell Adams
Assistant Examiner—Andrew Sever
(74) Attorney, Agent, or Firm—Merchant & Gould P.C.

(57) ABSTRACT

A projection display includes a projection lens and first and second light modulators on three sides of a color recombination unit. First and second blower units are respectively disposed on two sides of the projection lens for cooling the light modulators.

10 Claims, 8 Drawing Sheets

PROJECTION DISPLAY WITH TWIN-BLOWER HEAT-DISSIPATING SYSTEM

BACKGROUND OF THE INVENTION

1. Field of the Invention

The invention relates to projection displays, more particularly to a projection display having a twin-blower heat-dissipating system.

2. Description of the Related Art

It is a growing trend in the industry to reduce the size of projection displays for the purpose of portability. However, aside from portability, heat-dissipation and noise-reduction are also important factors that have to be taken into consideration in the design of projection displays.

Referring to FIGS. 1 and 2, a conventional liquid crystal projection display 1 is shown to comprise a light source 11 contained in a housing (not shown). White light radiated by the light source 11 is processed by a number of optical elements, such as filters, integrators, polarized beam splitting prisms, beam splitters, mirrors, etc., so as to separate the same into different color components, e.g. red, blue and green color components, that are directed respectively to three light modulators 12, 13, 14 for light modulation. The modulated color components are subsequently combined with the use of a color recombination unit 15, and are eventually projected with the use of a projection lens 16. The light modulators 12, 13, 14 are generally disposed respectively adjacent to right lateral, left lateral and rear sides of the recombination unit 15.

It is noted that heat is generated at the vicinity of the light modulators 12, 13, 14 during operation of the projection display. The generated heat must be dissipated to prevent image degradation and breakdown of the projection display.

FIG. 2 illustrates a conventional arrangement for dissipating heat in the projection display 1. As shown, a fan 17 is disposed beneath the light modulators 12, 13, 14 and the recombination unit 15, and generates upwardly directed cooling air currents. Of course, it is also possible to install the fan 17 above the light modulators 12, 13, 14 and the recombination unit 15. In the latter case, the fan 17 generates downwardly directed cooling air currents.

Some of the drawbacks of the conventional heat-dissipating arrangement of FIG. 2 are as follows:

1. The location of the fan 17 necessitates an increase in the thickness of the projection display 1. In addition, adequate clearances must be present at the air inlet and air outlet for efficient heat dissipation.

2. A dust cover (not shown) is usually disposed at the air inlet to protect the fan 17. If the fan 17 is not adequately spaced apart from the dust cover, a large air resistance and a relatively loud noise are generated. If the fan 17 is spaced far apart from the dust cover, a further increase in the thickness of the projection display 1 is incurred.

3. Because the air currents generated by the fan 17 only flow directly upward or downward, they cannot be relied upon to cool other parts of the projection display 1.

FIG. 3 illustrates another conventional liquid crystal projection display 2 with a single-blower heat-dissipation system. As shown, a blower unit 22 is disposed at one side of a projection lens 21. The blower unit 22 draws cooling air in a first direction, and releases the cooling air in a second direction that is transverse to the first direction. The cooling air from the blower unit 22 moves along the light modulators 23, 24, 25 for cooling the latter. While the heat-dissipating arrangement of FIG. 3 does not incur a considerable increase in the thickness of the projection display 2, it is noted that the cooling air from the blower 22 is only used to cool the vicinities of the light modulators 23, 24, 25. In addition, because a blower unit is generally characterized with a higher airflow resistance as compared to a similarly sized fan, the blower unit usually has a lower airflow rate than a fan of the same size. Thus, a single blower unit is insufficient to achieve effective heat dissipation in a projection display with a high brightness design. While it is possible to increase the blower speed to increase the airflow rate, this will involve a corresponding increase in noise.

FIG. 4 illustrates yet another conventional liquid crystal projection display 3 with a triple-blower heat-dissipation system. As shown, a first blower unit 321 is disposed at one side of a projection lens 31, whereas second and third blower units 322, 323 are disposed at the other side of the projection lens 31. Each of the blower units 321, 322, 323 draws cooling air from the outside, and provides the cooling air to a respective one of three light modulators 331, 332, 333 for cooling the latter. While the heat-dissipating arrangement of FIG. 4 does not incur a considerable increase in the thickness of the projection display 3, and is capable of providing adequate air currents for efficient cooling, the use of the three blower units 321, 322, 323 involves a large increase in both manufacturing cost and noise, and necessitates a large installation space for the blower units 321, 322, 323. There is thus a need to reduce the size of other components, such as circuit boards, inside the projection display 3 to compensate for the increase in the volume attributed to the blower units 321, 322, 323. Moreover, the cooling air currents from the blower units 321, 322, 323 are only used to cool the vicinities of the light modulators 331, 332, 333.

SUMMARY OF THE INVENTION

Therefore, the main object of the present invention is to provide a projection display having a twin-blower heat-dissipating system that is capable of overcoming the aforesaid drawbacks of the prior art.

According to this invention, a projection display comprises a color recombination unit, a projection lens, first and second light modulators, and first and second blower units. The color recombination unit has a front side, a rear side opposite to the front side, and opposite first and second lateral sides that extend between the front and rear sides. The projection lens is disposed adjacent to the front side of the color recombination unit, and has opposite first and second sides. The first light modulator is disposed adjacent to one of the first and second lateral sides and the rear side of the color recombination unit. The second light modulator is disposed adjacent to another one of the first and second lateral sides and the rear side of the color recombination unit. The first and second blower units are respectively disposed adjacent to the first and second sides of the projection lens. The first blower unit has a first air inlet, a first air outlet with an axis transverse to that of the first air inlet, and a first air passage that fluidly communicates the first air inlet and a vicinity of the first light modulator. The first blower unit is operable such that air from the vicinity of the first light modulator can be drawn into the first air inlet via the first air passage, and can be subsequently released via the first air outlet. The second blower unit has a second air inlet, a second air outlet with an axis transverse to that of the second air inlet, and a second air passage that fluidly communicates the second air inlet and a vicinity of the second light modulator. The second blower unit is operable such that air from the vicinity of the second light modulator can be drawn into the second air inlet via the second air passage, and can be subsequently released via the second air outlet.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
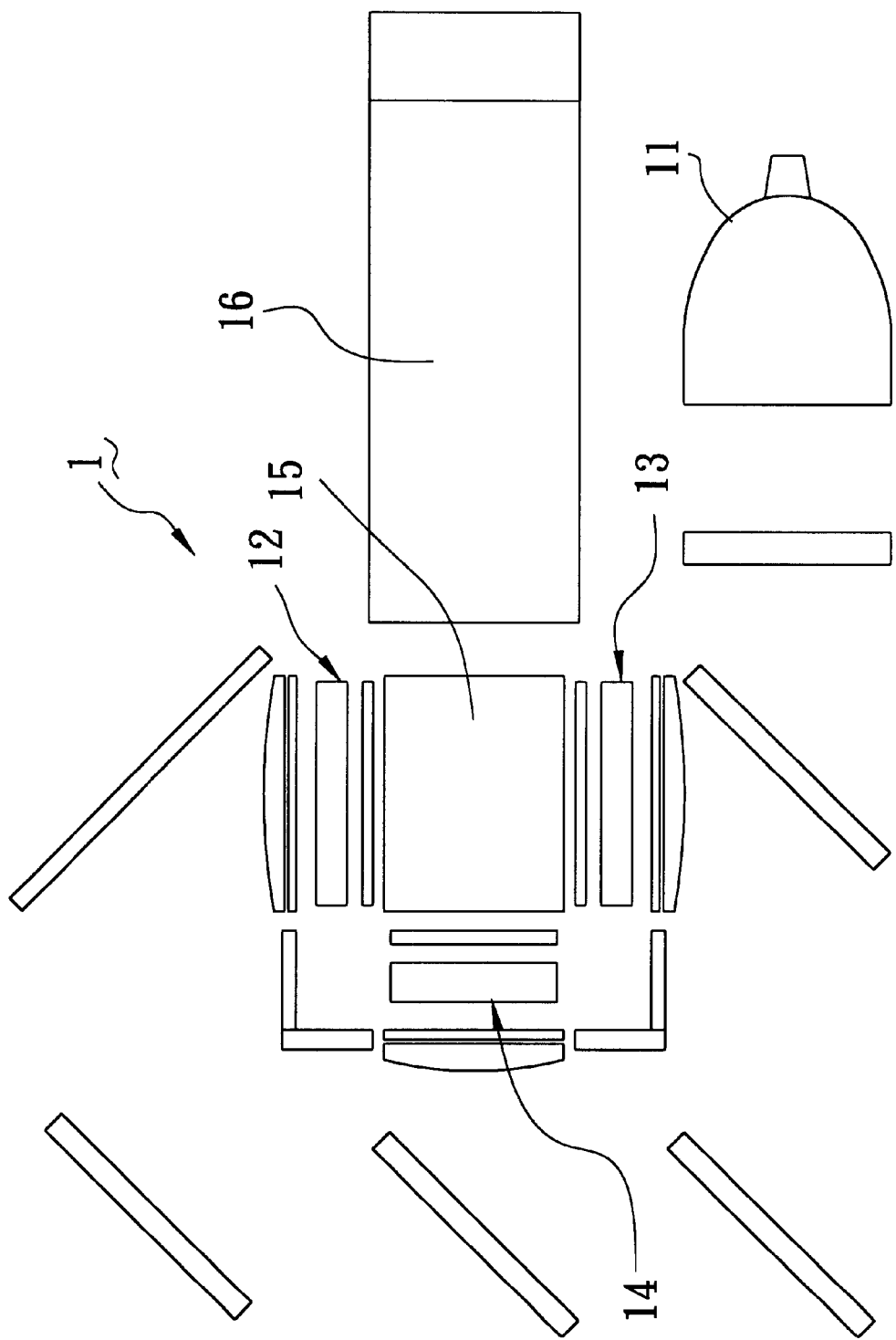
FIG. 1 is a schematic view illustrating a conventional projection display.
Figure 2:
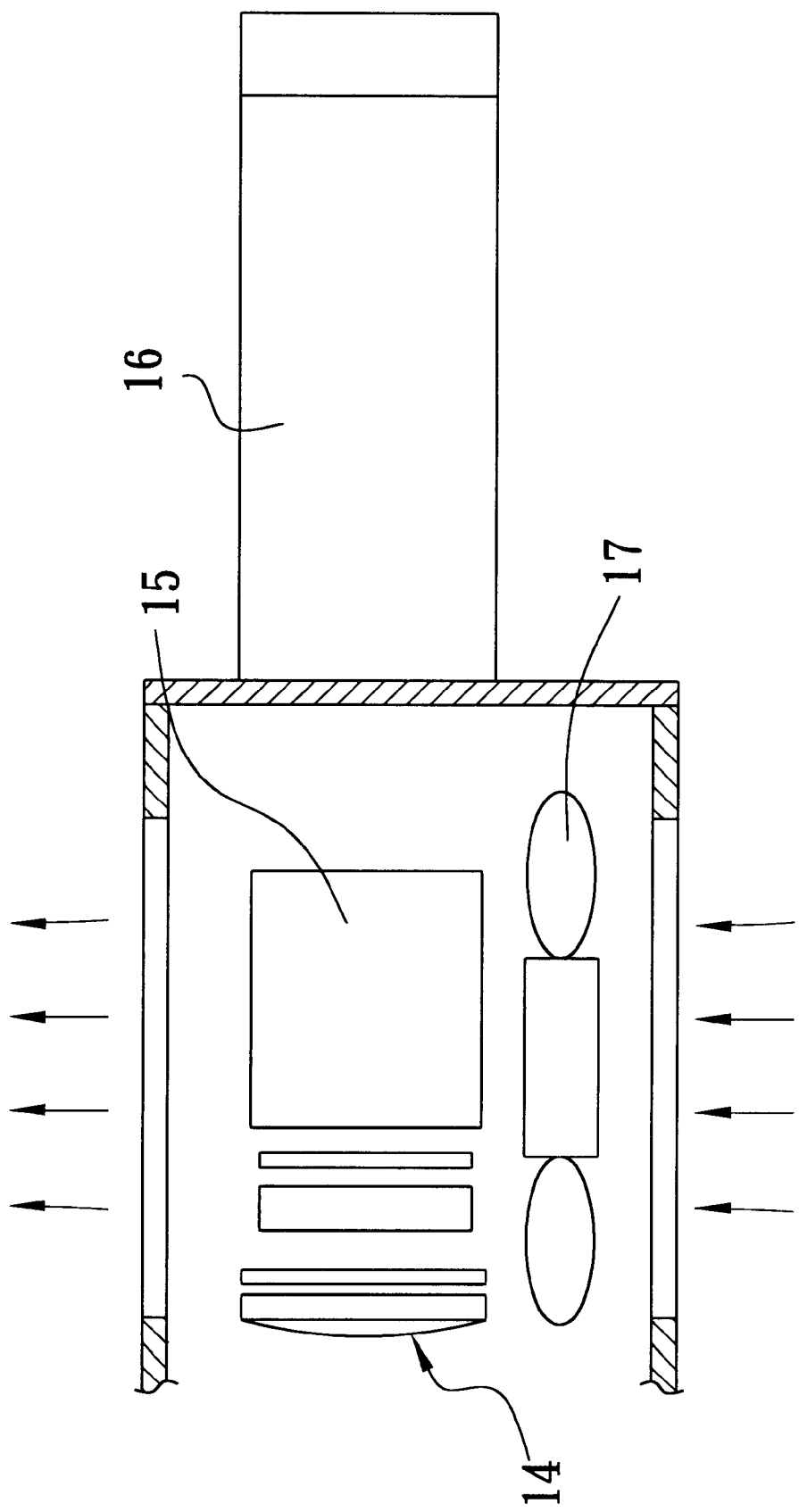
FIG. 2 illustrates a fan-type heat-dissipation system for the conventional projection display of FIG. 1.
Figure 3:
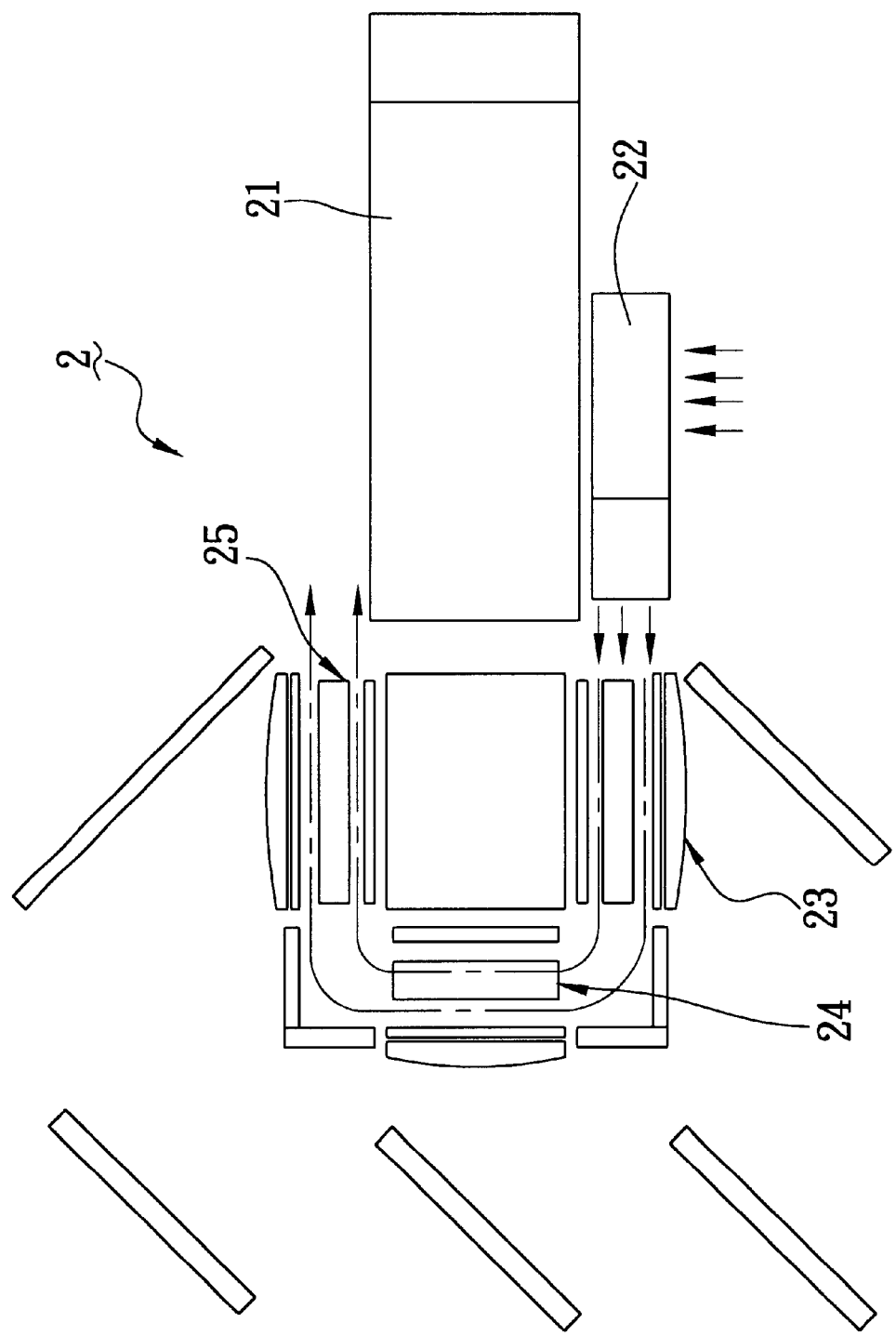
FIG. 3 is a schematic view illustrating another conventional projection display with a single-blower heat-dissipation system.
Figure 4:
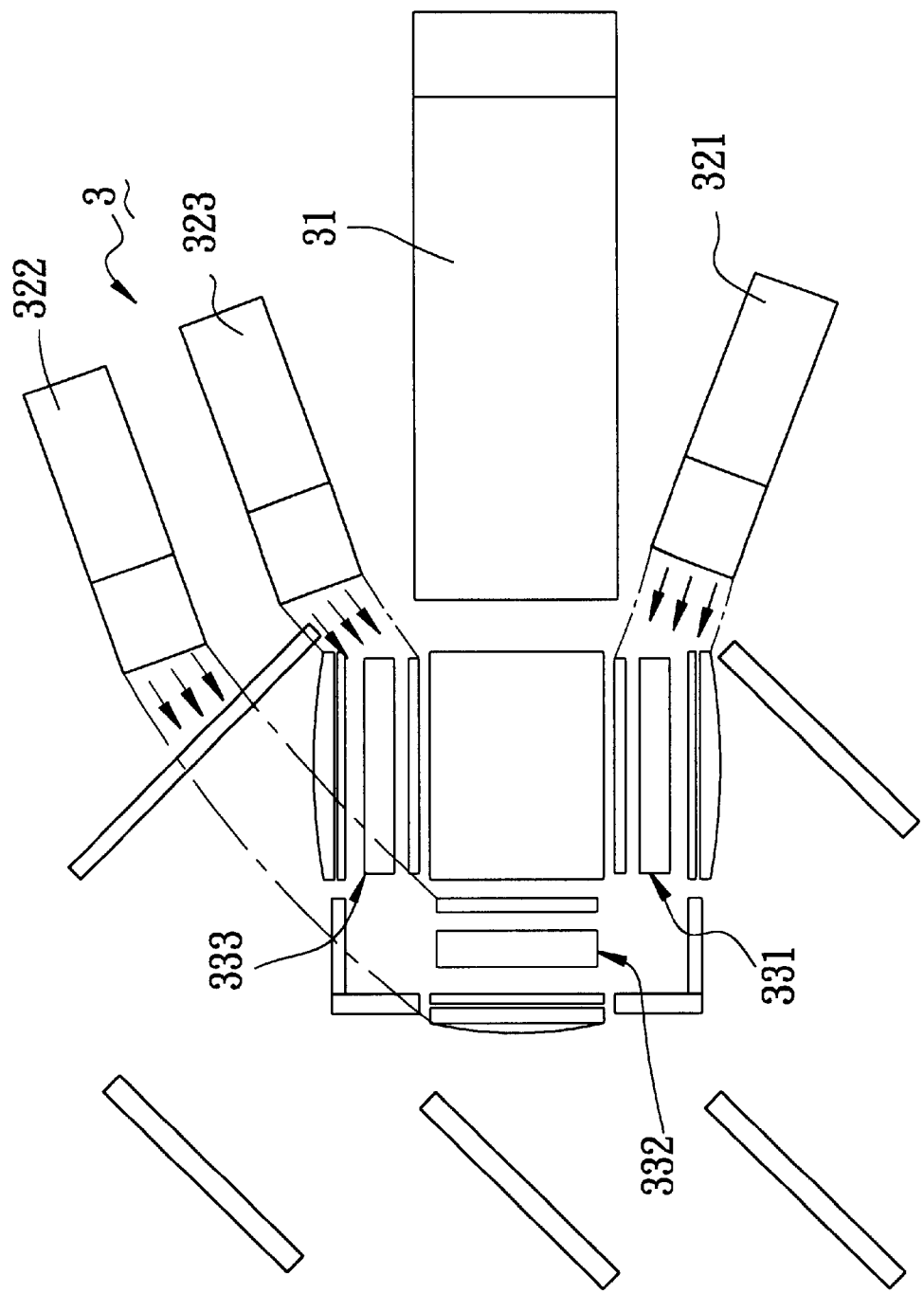
FIG. 4 is a schematic view illustrating yet another conventional projection display with a triple-blower heat-dissipation system.
Figure 5:
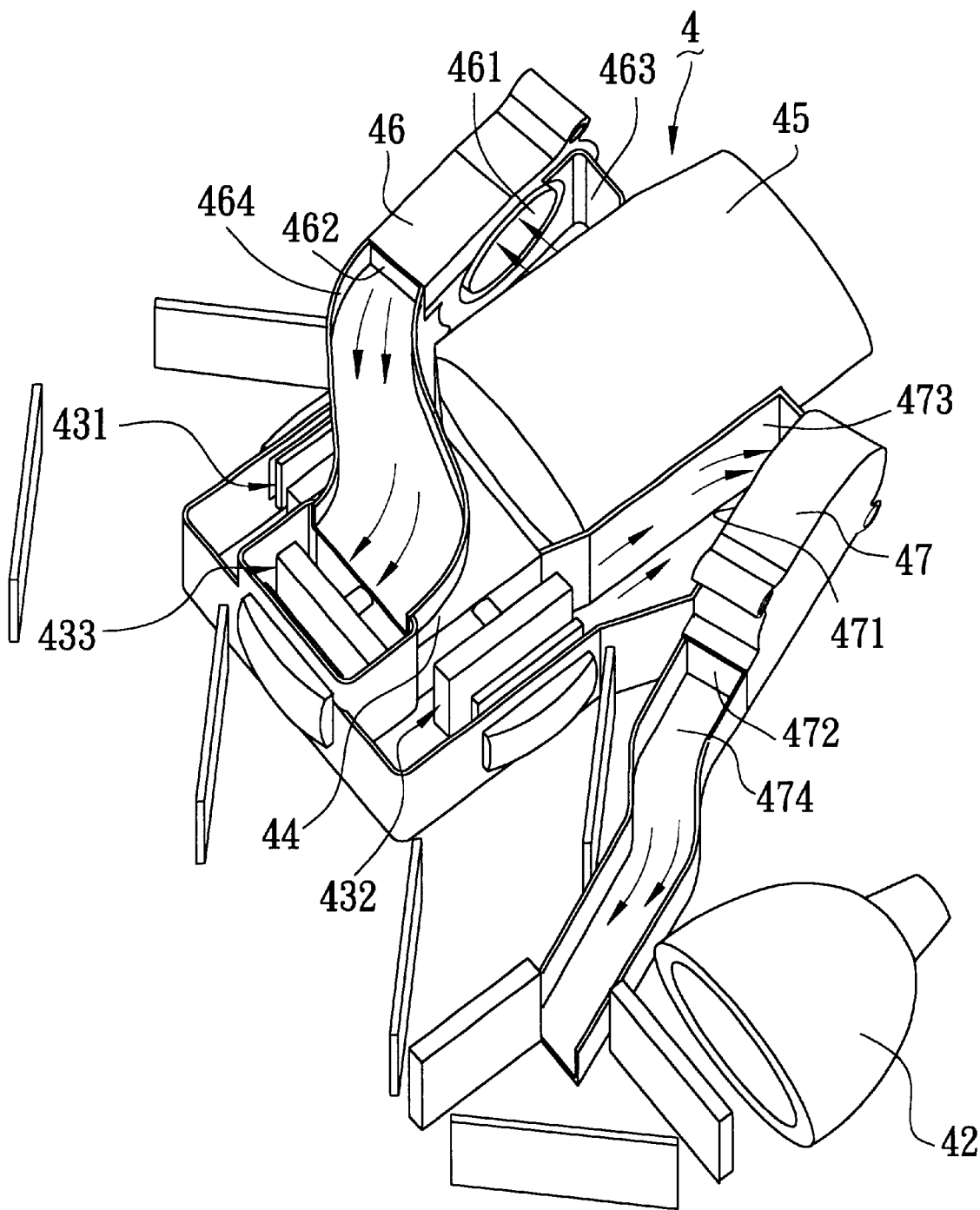
FIG. 5 is a perspective view illustrating the preferred embodiment of a projection display with a twin-blower heat-dissipation system according to the present invention.
Figure 6:
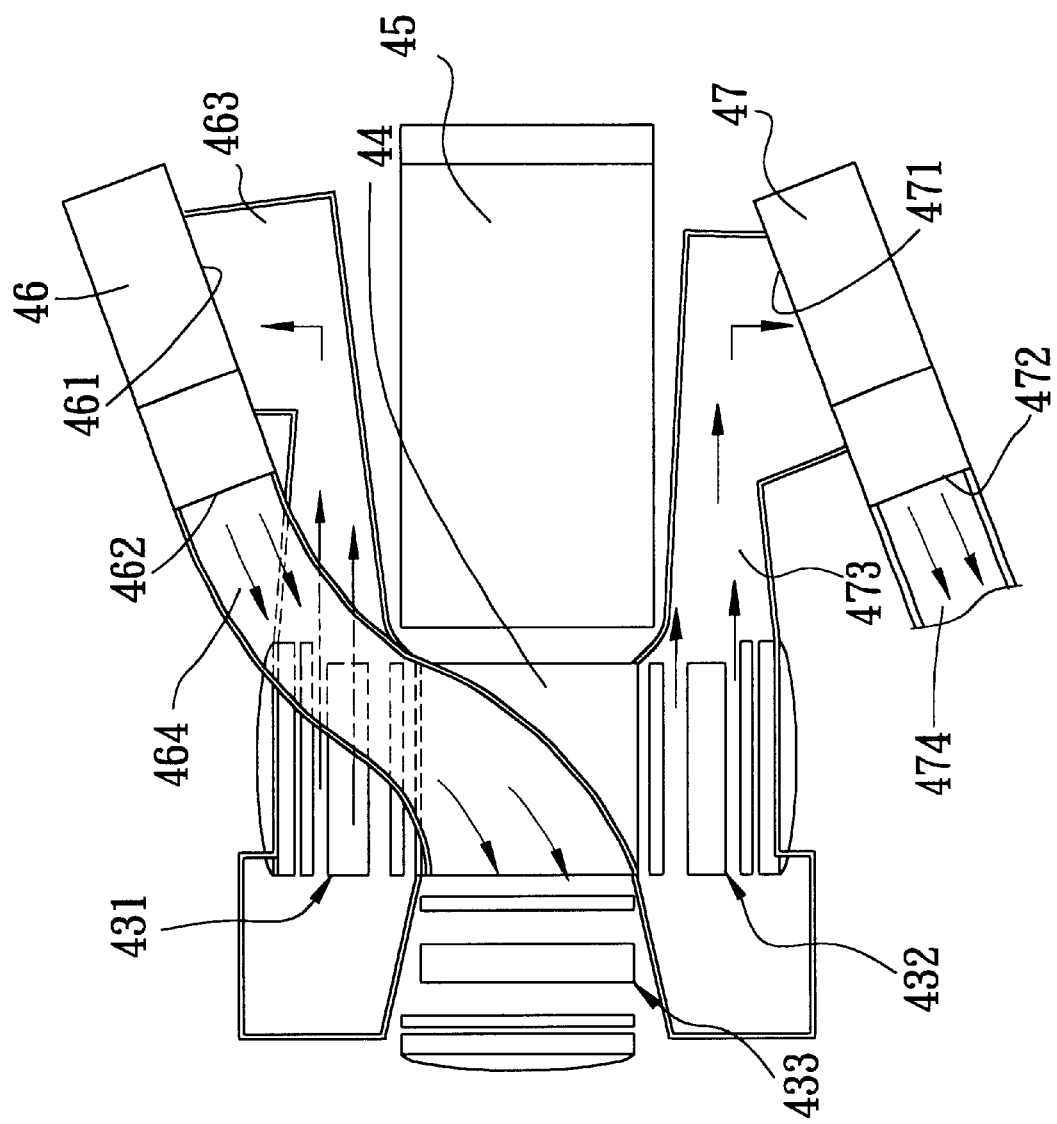
FIG. 6 is a schematic view of the preferred embodiment.

Referring to FIGS. 5 and 6, the preferred embodiment of a projection display 4 according to the present invention is shown to comprise a light source 42 contained in a housing (not shown). White light radiated by the light source 42 is processed by a number of optical elements, such as filters, integrators, polarized beam splitting prisms, beam splitters, mirrors, etc., so as to separate the same into first, second and third color components, e.g. red, blue and green color components, that are directed respectively to first, second and third light modulators 431, 432, 433 for light modulation. The light modulators 431, 432, 433 are disposed respectively adjacent to right lateral, left lateral and rear sides of a color recombination unit 44. The modulated color components are subsequently combined with the use of the color recombination unit 44, and are eventually projected with the use of a projection lens 45 that is disposed adjacent to a front side of the color recombination unit 44 to form an image on a display screen (not shown). First and second blower units 46, 47 are disposed respectively adjacent to right and left sides of the projection lens 45.

Figure 7:
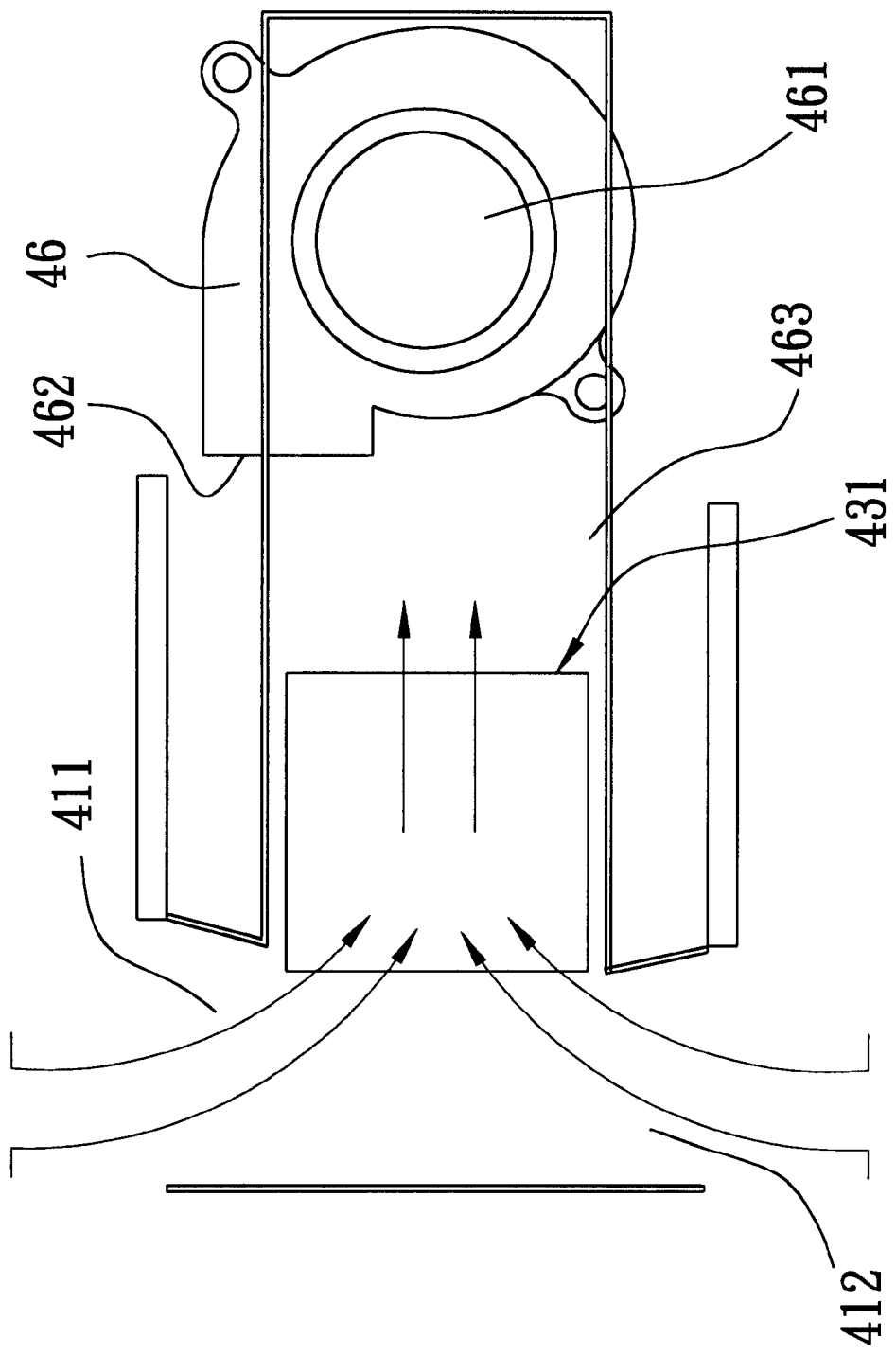
FIG. 7 is a fragmentary schematic view to illustrate an air drawing action of a first blower unit of the preferred embodiment.
Figure 8:
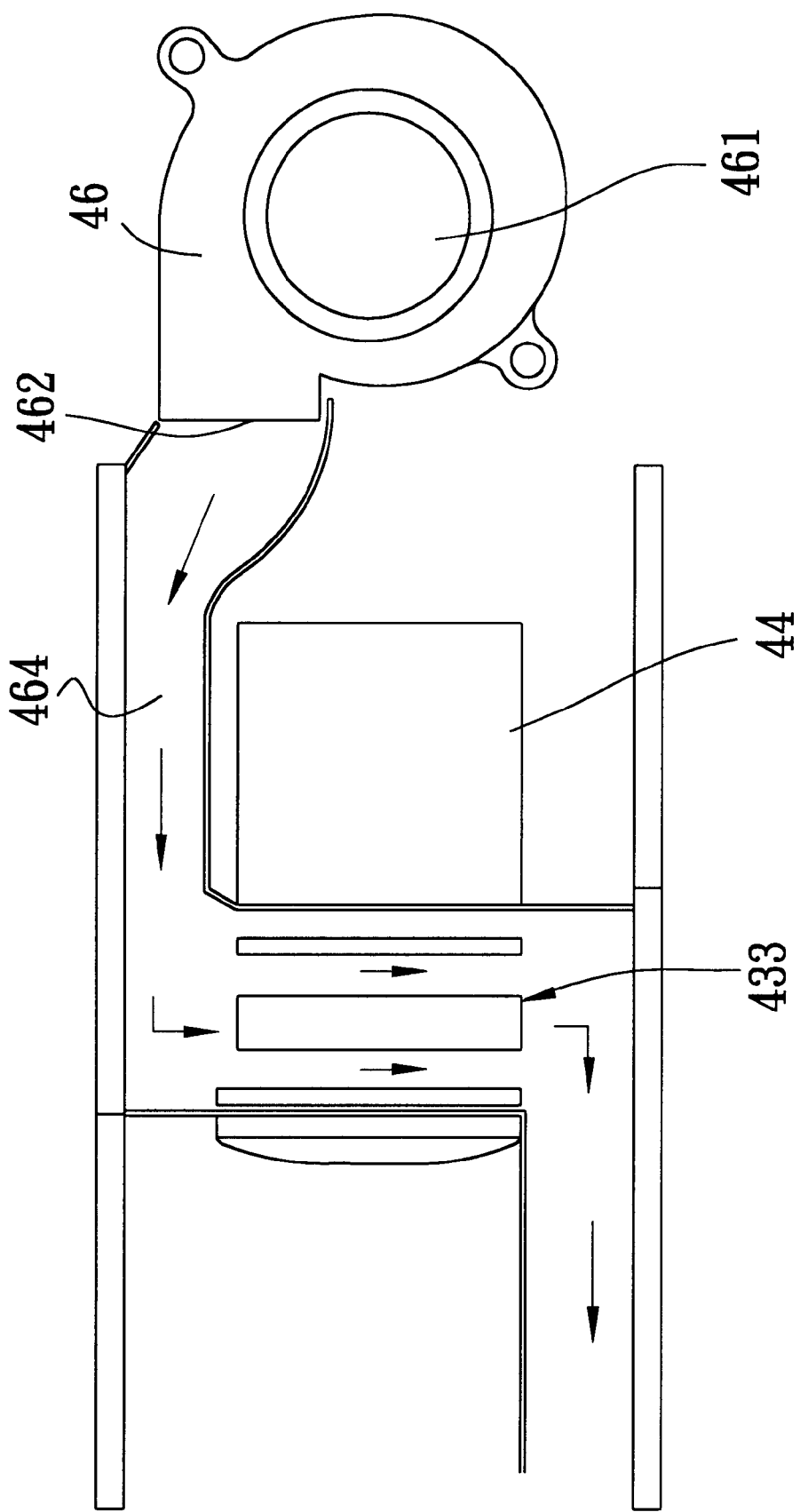
FIG. 8 is a fragmentary schematic view to illustrate an air releasing action of the first blower unit of the preferred embodiment.

The first blower unit 46, which is disposed in front of the first light modulator 431, and has a first air inlet 461 and a first air outlet 462. The first air inlet 461 is spaced apart from and confronts the right side of the projection lens 45. A first air passage 463 extends from between the first air inlet 461 and the right side of the projection lens 45 to a location rearwardly of the first light modulator 431 so as to fluidly communicate the first air inlet 461 and a vicinity of the first light modulator 431. The first air passage 463 is configured to allow air to enter thereinto from above and below via upper and lower apertures 411, 412 at the location rearwardly of the first light modulator 431 when the first blower unit 46 operates. Air that is drawn into the first air passage 463 moves to cool the first light modulator 431 and other nearby optical components, and enters the first air inlet 461, as best shown in FIGS. 6 and 7. The first air outlet 462 has an axis transverse to that of the first air inlet 461, is disposed at a level higher than the first air inlet 461, and opens rearwardly. A first air guide member 464 extends above the recombination unit 44 and rearwardly from the first air outlet 462 to a vicinity of the third light modulator 433. As such, air that is released at the first air outlet 462 can be guided to the vicinity of the third light modulator 433 via the first air guide member 464 and disperse downwardly for cooling the third light modulator 433 and other nearby optical components, as best shown in FIG. 8.

The second blower unit 47, which is disposed in front of the second light modulator 432, and has a second air inlet 471 and a second air outlet 472. The second air inlet 471 is spaced apart from and confronts the left side of the projection lens 45. A second air passage 473 extends from between the second air inlet 471 and the left side of the projection lens 45 to a location rearwardly of the second light modulator 432 so as to fluidly communicate the second air inlet 471 and a vicinity of the second light modulator 432. The second air passage 473 is configured to allow air to enter thereinto from above and below via upper and lower apertures (not shown) at the location rearwardly of the second light modulator 432 when the second blower unit 47 operates. Air that is drawn into the second air passage 473 moves to cool the second light modulator 432 and other nearby optical components, and enters the second air inlet 471. The second air outlet 472 has an axis transverse to that of the second air inlet 471, is disposed at a level higher than the second air inlet 471, and opens rearwardly. A second air guide member 474 extends rearwardly from the second air outlet 472 such that air released at the second air outlet 472 can be guided by the second air guide member 474 to another optical component or to the system power unit of the projection display 4 for cooling the same.

It is noted that the twin-blower heat-dissipation arrangement used in the projection display 4 of the present invention does not involve an increase in the thickness of the projection display 4. Because the first and second blower units 46, 47 are contained in the housing of the projection display 4, the noise that can be heard during operation of the blower units 46, 47 can be diminished. Moreover, because the blower units 46, 47 are disposed at the left and right sides of the projection lens 45, and since air enters into the housing of the projection display 4 from the top and bottom at a rear portion of the projection display 4, noise that can be heard during operation of the blower units 46, 47 can be further reduced. In addition, the air entering and leaving the first and second blower units 46, 47 are relied upon effectively to cool a large number of components of the projection display 4 of this invention.

The projection display of the present invention is not limited to one that includes three light modulators. In a projection display that includes only two light modulators, one of the light modulators is responsible for modulating a first color component, whereas the other one of the light modulators is responsible for modulating second and third color components. In this case, air passes through one of the light modulators into the air inlet of a respective one of the blower units. The air released from the air outlet of each of the blower units can then be directed to another optical component of the projection display via a respective air guide member.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A projection display comprising:

a color recombination unit having a front side, a rear side opposite to said front side, and opposite first and second lateral sides that extend between said front and rear sides;

a projection lens disposed adjacent to said front side of said color recombination unit and having opposite first and second sides;

a first light modulator disposed adjacent to one of said first and second lateral sides and said rear side of said color recombination unit;

a second light modulator disposed adjacent to another one of said first and second lateral sides and said rear side of said color recombination unit; and first and second blower units respectively disposed adjacent to said first and second sides of said projection lens;

said first blower unit having a first air inlet, a first air outlet with an axis transverse to that of said first air inlet, and a first air passage that fluidly communicates said first air inlet and a vicinity of said first light modulator, said first blower unit being operable such that air from the vicinity of said first light modulator can be drawn into said first air inlet via said first air passage, and can be subsequently released via said first air outlet;

said second blower unit having a second air inlet, a second air outlet with an axis transverse to that of said second air inlet, and a second air passage that fluidly communicates said second air inlet and a vicinity of said second light modulator, said second blower unit being operable such that air from the vicinity of said second light modulator can be drawn into said second air inlet via said second air passage, and can be subsequently released via said second air outlet.

2. The projection display of claim 1, further comprising a third light modulator disposed adjacent to yet another one of said first and second lateral sides and said rear side of said color recombination unit, and a first air guide member that extends from said first air outlet to a vicinity of said third light modulator to guide the air released from said first air outlet to the vicinity of said third light modulator.

3. The projection display of claim 2, wherein said first light modulator is disposed adjacent to said first lateral side of said color recombination unit, said second light modulator is disposed adjacent to said second lateral side of said color recombination unit, and said third light modulator is disposed adjacent to said rear side of said color recombination unit.

4. The projection display of claim 3, wherein said first air inlet is spaced apart from and confronts said first side of said projection lens, said first air passage extending from between said first air inlet and said first side of said projection lens to a location rearwardly of said first light modulator.

5. The projection display of claim 4, wherein said first air passage is configured to allow air to enter thereinto from above and below at the location rearwardly of said first light modulator when said first blower unit operates.

6. The projection display of claim 3, wherein said first air outlet is disposed at a level higher than said first air inlet and opens rearwardly, said first air guide member extending above said color recombination unit and rearwardly from said first air outlet to the vicinity of said third light modulator.

7. The projection display of claim 3, wherein said second air inlet is spaced apart from and confronts said second side of said projection lens, said second air passage extending from between said second air inlet and said second side of said projection lens to a location rearwardly of said second light modulator.

8. The projection display of claim 7, wherein said second air passage is configured to allow air to enter thereinto from above and below at the location rearwardly of said second light modulator when said second blower unit operates.

9. The projection display of claim 1, further comprising at least one air guide member that extends from a respective one of said first and second air outlets to guide the air released from the respective one of said first and second air outlets.

10. The projection display of claim 9, wherein each of said first and second air outlets is disposed at a level higher than the respective one of said first and second air inlets and opens rearwardly.

* * * * *